US009732795B2

(12) United States Patent
Gerstenberger et al.

(10) Patent No.: US 9,732,795 B2
(45) Date of Patent: Aug. 15, 2017

(54) CUTTING ASSEMBLY OF A CHAINSAW AND SAW CHAIN

(75) Inventors: Oliver Gerstenberger, Ditzingen (DE); Berthold Schell, Backnang (DE); Alexander Fuchs, Bietigheim-Bissingen (DE); Jan Föhrenbach, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 1512 days.

(21) Appl. No.: 13/177,982

(22) Filed: Jul. 7, 2011

(65) Prior Publication Data
US 2012/0005901 A1   Jan. 12, 2012

(30) Foreign Application Priority Data

Jul. 7, 2010   (DE) .................. 10 2010 026 324

(51) Int. Cl.
*B27B 17/12* (2006.01)
*B27B 33/14* (2006.01)
*F16C 33/10* (2006.01)

(52) U.S. Cl.
CPC ........ *F16C 33/1075* (2013.01); *B27B 33/147* (2013.01); *Y10T 83/909* (2015.04)

(58) Field of Classification Search
CPC ......... B27B 33/02; B27B 33/14; B27B 17/02; B27B 17/04; B27B 17/12; B27B 13/00
USPC ......... 83/835, 832, 830, 831, 833, 834, 846, 83/848–850, 853–855, 169; 30/381–387, 30/123.4, 123.3; 29/428; 76/29, 80.5, 30
See application file for complete search history.

(56) References Cited

U.S. PATENT DOCUMENTS

| 4,816,010 A * | 3/1989 | Reynolds .................. 474/92 |
| 4,934,052 A * | 6/1990 | Nitschmann et al. ....... 30/123.4 |
| 6,095,690 A | 8/2000 | Niegel et al. |
| 6,283,389 B1 * | 9/2001 | Hofmann ................. 239/533.11 |
| 2002/0018604 A1 | 2/2002 | Weissbacher |
| 2003/0051351 A1 | 3/2003 | Buchholtz et al. |
| 2008/0011144 A1 * | 1/2008 | Harfst et al. .................. 83/830 |

FOREIGN PATENT DOCUMENTS

| RU | 2060877 C1 | 5/1996 |
| SU | 37965 A1 | 7/1934 |

OTHER PUBLICATIONS

English translation and Russian Office action dated May 15, 2015 of parallel Russian application 2011127143/13 (040182).

* cited by examiner

*Primary Examiner* — Ghassem Alie
(74) *Attorney, Agent, or Firm* — Walter Ottesen, P.A.

(57) ABSTRACT

A cutting assembly of a chainsaw includes a saw chain and a guide bar (4) for guiding the saw chain (3) along a peripheral edge (5) of the guide bar. The saw chain (3) has drive links (6) having drive bases (7) which with their side surfaces (8, 8') are slidingly guided between the side walls (9) of a guide groove (10) of the guide bar (4) with the formation of a friction pairing. Lubricant pockets (11) are formed in the side surface (8). The lubricant pockets (11) are only open toward the corresponding side wall (9) of the guide groove (10) and are otherwise closed. Offside the lubricant pockets (11), the side surface (8) has a flat sliding surface (12) which slides on the side wall (9) of the guide groove (10). The lubricant pocket (11) has a mean diameter and a maximum depth. The ratio of the mean diameter to the maximum depth lies in a range of 5.0 up to and including 25.0.

28 Claims, 3 Drawing Sheets

CUTTING ASSEMBLY OF A CHAINSAW AND SAW CHAIN

CROSS REFERENCE TO RELATED APPLICATION

This application claims priority of German patent application no. 10 2010 026 324.9, filed Jul. 7, 2010, the entire content of which is incorporated herein by reference.

FIELD OF THE INVENTION

The invention relates to a cutting assembly of a chainsaw.

BACKGROUND OF THE INVENTION

Cutting assemblies of a chainsaw as well as the associated saw chains are subject to high mechanical stress during operation. Wear arises, in particular, resulting from friction between individual movable parts.

Such a cutting assembly fundamentally includes a guide bar along whose outer peripheral edge a guide groove is formed in which a saw chain of individual, pivotally connected chain links travels. The saw chain has individual drive links which are guided in the guide groove with their respective drive bases. When the saw chain is traveling, frictional forces occur, in particular, between the side walls of the stationary guide groove and the side surfaces of the drive bases moved relative thereto.

For the lubrication of the existing friction pairings, a plurality of lubrication arrangements is known in which a lubricant, for example, in the form of lubricating oil, is introduced in the guide groove and received by the drive links there. With smooth and flat configurations of the sliding surfaces, it may be that the lubricating oil film formed thereon is removed locally, thus resulting in a local dry friction with high wear.

To avoid the aforementioned lubricant tear off and the related dry friction, various measures are known which, for example, include a continuous lubricant supply opening arranged in the drive base as well as lubricant channels arranged in the side surfaces of the drive base. Such an arrangement is, for example, known from United States patent application publication 2003/0051351, whereby either additionally or alternatively thereto the sliding surfaces of the drive bases can be provided with a surface structuring. The known surface structuring can, for example, include lubricant pockets formed in the side surfaces, which are open only to the side wall of the guide groove and are otherwise closed, that is, have no connection to the lubricant supply opening or the lubricant channel. It has been shown that in broad terms such surface structuring does not ensure the desired effect in terms of forming a lubricant film reliably protected against removal or tear off.

SUMMARY OF THE INVENTION

It is an object of the invention to provide a cutting assembly wherein the formation of a reliably closed lubricant film is ensured.

The cutting assembly of the invention is for a handheld motor-driven chainsaw. The cutting assembly includes: a saw chain having a plurality of pivotally interconnected chain links wherein a portion of the chain links are drive links having respective drive bases; a guide bar having a peripheral edge defining a guide groove having side walls; the guide bar being configured to guide the saw chain along the peripheral edge; each one of the drive bases having side surfaces and being configured to be slidingly guided between the side walls of the guide groove under the formation of a friction pairing; a plurality of lubricant pockets formed in at least one of the side surfaces and being open toward the side wall of the guide groove corresponding to the one side surface and the lubricant pockets being otherwise closed; the one side surface having a flat sliding surface outside of the lubricant pockets which is configured to slide along the side wall of the guide groove corresponding thereto; the lubricant pockets having a mean diameter (d) and a maximum depth (t); and, the mean diameter (d) having a ratio to the maximum depth (t) of 5.0 up to and including 25.0.

It is a further object of the invention to provide a saw chain which, when used in a cutting assembly, can form a removal-free lubricant film.

The saw chain of a cutting assembly of the invention is for a handheld motor-driven chainsaw. The cutting assembly includes a guide bar having a peripheral edge defining a guide groove having side walls and the guide bar being configured to guide the saw chain along the peripheral edge. The saw chain includes: a plurality of pivotally interconnected chain links wherein a portion of the chain links are drive links having respective drive bases; each one of the drive bases having side surfaces and being configured to be slidingly guided between the side walls of the guide groove under the formation of a friction pairing; a plurality of lubricant pockets formed in at least one of the side surfaces and being open toward the side wall of the guide groove corresponding to the one side surface and the lubricant pockets being otherwise closed; the one side surface having a flat sliding surface outside of the lubricant pockets which is configured to slide along the side wall of the guide groove corresponding thereto; the lubricant pockets having a mean diameter (d) and a maximum depth (t); and, the mean diameter (d) having a ratio to the maximum depth (t) of 5.0 up to and including 25.0.

Due to a particular geometrical adaptation of the lubricant pockets in the side surfaces of the drive bases, a particular, surprising effect can be achieved: the provided lubricating oil forms a lubricant film at the friction pairing between the side surfaces of the drive bases and the side walls of the guide groove, while a lubricant reservoir accumulates in the interior of the lubricant pockets. An intermediate discharge volume of the lubricant forms between the lubricant reservoir and the lubricant film. On the one hand, this discharge volume supplements the lubricant film, if it is at risk of becoming too thin. On the other hand, the discharge volume generates a turbulent area in the lubricant film not only directly at the lubricant pocket but also in the adjacent areas of the flat and smooth sliding surfaces formed outside the lubricant pockets. On the basis of a suitable amount, distribution, and configuration of the lubricant pockets, the turbulent area of the lubricant film extends at least approximately entirely over the entire side surface of the drive bases. Hereby, and due to the film thickness sufficient in all operating states, any local removal of the lubricant film also outside the lubricant pockets at the flat and smooth sliding surfaces of the drive bases can reliably be avoided. On the contrary, a closed lubricant film without local film removal and without local dry friction will form. Friction and wear are thus significantly diminished.

The aforementioned, surprising effects can be achieved when the ratio of the mean diameter to the maximum depth of the lubricant pocket is in a range of 5.0 up to and including 25.0, preferably in a range of 7.0 up to and including 15.0 and in particular 10.0. The mean diameter of the lubricant pocket advantageously is in a range of 0.6 mm up to and including 1.0 mm, preferably in a range of 0.7 mm up to and including 0.9 mm and in particular is approximately 0.8 mm. The maximum depth of the lubricant pocket thereby advantageously is in a range of 0.04 mm up to and including 0.12 mm, preferably in a range of 0.06 mm up to and including 0.10 mm and in particular is approximately 0.08 mm.

In order to achieve the advantageous effect described above, different longitudinal section shapes or longitudinal section contours of the lubricant pockets are considered. In particular, the lubricant pocket has a concavely curved pocket base with a mean curving radius. The mean curving radius of the pocket base is in a range of 1.5 mm up to and including 5.5 mm, preferably in a range of 2.5 mm up to and including 4.5 mm and in particular is approximately 3.5 mm.

In order to ensure a reliable lubricant exchange between the lubricant reservoir of the lubricant pockets and the lubricant film it can be practical that the lubricant pocket has a convexly rounded, peripheral pocket edge with a mean curving radius. The mean radius of curvature of the pocket edge is in a range of 0.05 mm up to and including 0.25 mm and in particular is approximately 0.15 mm.

The lubricant pocket advantageously has a volume which is in a range of 0.012 mm$^3$ up to and including 0.028 mm$^3$ and in particular is approximately 0.020 mm$^3$. In practice, it has been shown that a sufficiently large reservoir and a sufficiently large discharge volume of the lubricant are hereby provided for the lubricant film, without the remaining smooth and flat sliding surfaces of the drive bases being disturbed too much. The lubricant pockets preferably each have a pocket area, whereby the sliding surface formed outside of the pockets has a base surface over its entirety. The sum of the pocket areas of an individual side surface is in a range of 10% up to and including 40%, preferably in a range of 15% up to and including 30% of the base surface, and in particular approximately 20% of the base surface. On the one hand, a reliable formation of a lubricant film which is sufficiently thick and is not subject to removal is ensured. On the other hand, the remaining sliding surface has a sufficiently large base area for the necessary load capacity for receiving the operating loads.

The side surfaces of the drive bases are delimited by an edge. The lubricant pockets are advantageously at a distance of at least 0.5 mm to this edge. Thus, any unnecessary loss of lubricant from the reservoir of the lubricant pockets and directly into the guide groove of the guide bar is avoided.

A continuous lubricant supply opening and/or a lubricant channel are arranged in the drive base. In comparison to the lubricant pockets, the continuous lubricant supply opening provides a significantly larger supply volume of lubricant, which is emitted for the building up of a lubricant film also under difficult operating conditions. The lubricant channel provides for the distribution of the lubricant supply even at hard to reach locations. In addition, the lubricant pockets fulfill the task of local turbulence and maintenance of the closed lubricant film, due to which the reliability of the lubricating effect is increased while avoiding dry friction.

For the geometrical configuration of the lubricant pockets different options are available. The lubricant pocket preferably has a circularly-disc-shaped layout and, as a practical matter, has a pocket base in the form of a spherical segment. Hereby, high effectiveness is combined with simple manufacture, for example, by embossing. The formation of local stress peaks in the material of the drive bases is reduced to a minimum because of the embossing process.

For an even configuration of the lubricant film, a number of at least four, preferably at least seven and in particular at least ten lubricant pockets has turned out to be practical.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
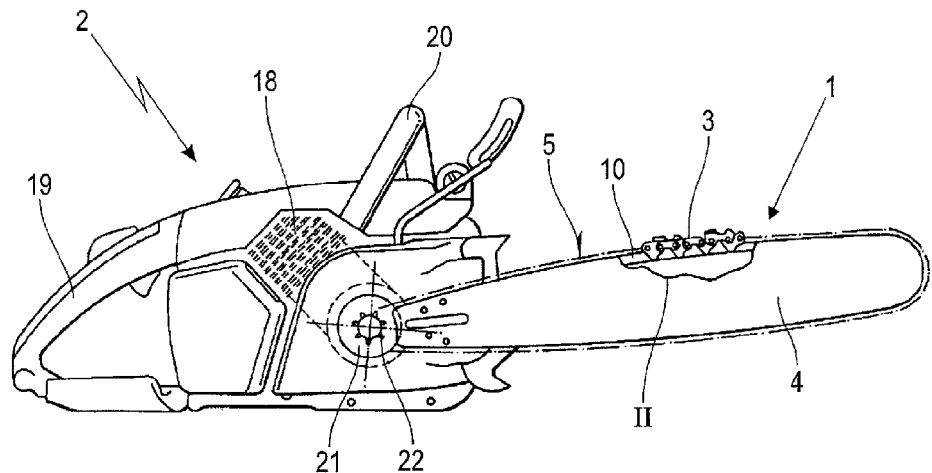
FIG. 1 is a schematic side view of a chainsaw with a cutting assembly according to the invention, shown partially in section.

FIG. 1 shows a schematic side view of a chainsaw 2 with a cutting assembly 1 according to the invention. Aside from the cutting assembly 1, the chainsaw 2 includes a motor and handle housing having a back handle 19 and a front handle 20 with which the chainsaw 2 is held and guided during operation. A drive motor 18, which, in the embodiment shown, is a single cylinder two-stroke combustion engine but can also, for example, be a four-stroke engine, is arranged in the motor housing. An electric motor can also be provided instead of a combustion engine.

The cutting assembly 1 includes a guide bar 4 as well as a saw chain 3 which is guided in a guide groove 10 of the guide bar around an edge 5 which partially surrounds the guide bar 4. The saw chain 3 is formed of pivotally interconnected chain links of which a portion is configured as drive links 6 having drive bases 7 as shown in more detail in FIGS. 2 and 7. The drive bases 7 shown in FIGS. 2 and 7 engage in the guide groove 10 by which the saw chain 3 is guided on the guide bar 4.

The drive motor 18 drives a chain sprocket 22 via a centrifugal clutch 21 above an engaging engine speed, the chain sprocket 22 being engaged with the drive bases 7 (FIGS. 2, 3) of the drive members via its radially protruding teeth. Thus, the drive motor 18 drives the saw chain 3 around the outer edge 5 of the guide bar 4.

Figure 2:
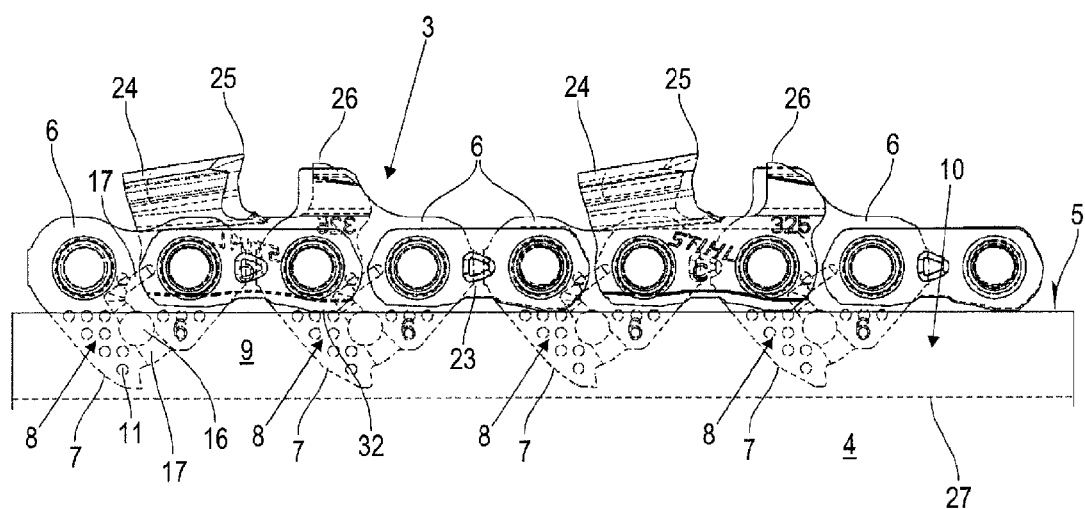
FIG. 2 is an enlarged view of the detail II of FIG. 1 with the chain links of the saw chain shown in detail.

A detail II, which is shown in an enlarged detailed view in FIG. 2, is also denoted in FIG. 1. Accordingly, the saw chain 3 includes cutting links 24 having blades 25 and depth limiters 26. Connecting links 23 are arranged between the individual cutting links 24. The connecting links 23 and cutting links 24 arranged in alternating sequence are articulately interconnected via pivot pins and pivotally connected to the drive links 6. The connecting links 23 and the cutting links 24 each have lower edges 32 with which they rest on the outer peripheral edge 5 of the guide bar 4. In this way, the drive bases 7 of the drive links 6 are at a distance in the upward direction from the groove base 27 of the guide groove 10. On its sides, the guide groove 10 is delimited by side walls 9 on which the side surfaces 8 of the drive bases 7 slide on both sides with formation of a friction pairing. For lubrication of the aforementioned friction pairing, a lubricant supply, not shown, is provided via which the liquid lubricating oil is supplied into the area of the guide groove 10.

According to the invention, lubricant pockets 11, whose configuration will be described in more detail below, are formed in the side walls 8 of the drive bases 7. Optionally, lubricant supply openings 16, described in more detail below, can be arranged in the drive bases 7 as well as indicated lubricant channels 17 can be arranged in the side surfaces 8 of the drive bases 7. The lubricant pockets 11, the lubricant supply openings 16, and the lubricant channels 17 serve the distribution as well as the local stocking up of small partial amounts of liquid lubricating oil as well as the formation of a closed lubricating oil film which extends over the entire side surface 8 of the drive bases 7 and does not tend to be torn away.

Figure 3:
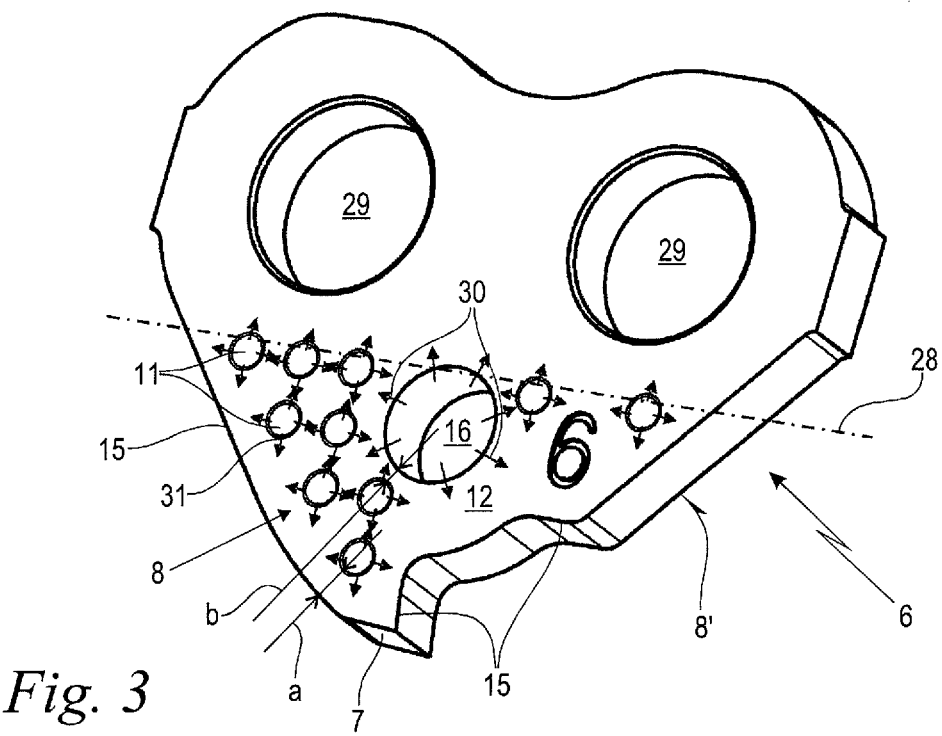
FIG. 3 is a perspective view of a drive link of FIGS. 1 and 2 with details on the configuration of its side surfaces and lubricant pockets embossed in the side surfaces.

FIG. 3 shows in perspective view a single drive link 6 of the saw chain 3 according to an embodiment of the invention according to FIGS. 1 and 2 with joint openings 29 for receiving the pivot pins via which the drive link 6 is pivotally connected to the adjacent connecting links 23 or cutting links 24. Parallel to the longitudinal direction of the stretched saw chain 3 (FIGS. 1, 2), a line 28 is drawn on whose side opposite the pivot pin openings 29 the drive base 7 extends with its side surfaces (8, 8') on both sides. Thereby, the line 28 together with the edge 15 delimits the side surface 8. The line 28 is given by the geometric connection of the lower edges 32 of the adjacent connecting links 23 and the cutting links 24 (FIG. 2) in a manner corresponding to the outer edge 5 of the guide bar 4. Within the side surfaces (8, 8') delimited by the aforementioned stipulation, a lubricated sliding friction of the drive links 6 on the side walls 9 of the guide groove 10 (FIGS. 1, 2) takes place.

Lubricant pockets 11 are formed in the side surface 8 of the drive base 7 which here faces the observer. In the embodiment shown, the lubricant pockets 11 are embossed in the drive link 6 made of steel. At least four, preferably at least seven and in particular at least ten lubricant pockets are arranged in each side surface 8. Here, exactly ten lubricant pockets 11 are provided per side surface 8 of the individual drive link 6. According to FIG. 6, the individual lubricant pockets 11 are open only toward the adjacent side wall 9 of the guide groove 10 and otherwise are closed, that is, neither interconnected nor connected to the lubricant supply openings 16 or the optional lubricant channel 17 (FIG. 2). According to the illustration of FIG. 4, each individual lubricant pocket 11 forms a closed volume limited by the enclosure/plane of a sliding surface 12 lying outside the lubricant pockets 11, by a pocket base 13, and by a pocket edge surrounding the lubricant pockets. The remaining area of the side surface 8 outside of the lubricant pockets 11, the lubricant supply opening 16, and the lubricant channel 17 (FIG. 2) is configured as a plane, smooth sliding surface 12 provided for resting against the side wall 9 of the guide groove 10 (FIGS. 1, 2).

During operation, lubricating oil is taken from the guide groove 10 by means of the drive bases 7 as shown in FIG. 2 and distributed on the outer surfaces of the drive links 6, where appropriate with the aid of the lubricant channels 17. Hereby, a large supply quantity of lubricating oil collects in the lubricant supply opening 16 (FIG. 3) which extends through the drive base 7. As indicated by arrows 30, the stored lubricating oil can, upon need, be discharged to replenish the existing lubricant film and be distributed over the side surfaces 8. Thereby, a portion of the lubricating oil reaches the individual lubricant pockets 11 as smaller, local supply quantities which in turn, upon need, can be discharged into the lubricating oil film on the side surfaces 8 and in particular on the sliding surfaces 12 in correspondence with arrows 31.

The lubricant pockets 11 can have different suitable planforms or contours. In the shown preferred embodiment, the planform of each individual lubricant pocket 11 is circularly-disc-shaped. Each circularly-disc-shaped planform has a pocket area of a single lubricant pocket 11, while the remaining sliding surface 12 extending offside the lubricant pockets 11, the lubricant supply openings 16, and the lubricant channels 17 (FIG. 2) has a base area. The sum of the pocket areas of a single side surface 8 lies in the range of 10% up to and including 40%, preferably in a range of 15% up to and including 30% of the base area of a single side surface 8. In the embodiment shown, the sum of the pocket areas of a single side surface 8 is, in particular, approximately 20% of the base area of a single side surface 8.

From FIG. 3, it can also be seen that the lubricant pockets 11 with their pocket edge 14 (FIG. 4) are at a distance (a) to the edge 15 of the drive base 7 as well as a distance (b) to the outer edge of the lubricant supply opening 16. The distance (a) is preferably at least 0.5 mm, while the distance (b) is at least 0.3 mm. If a lubricant channel 17 corresponding to FIG. 2 is also provided, the distance (b) should also be retained.

The opposite side surface 8', not shown here, is configured analogously to the side surface 8 described above.

Figure 4:
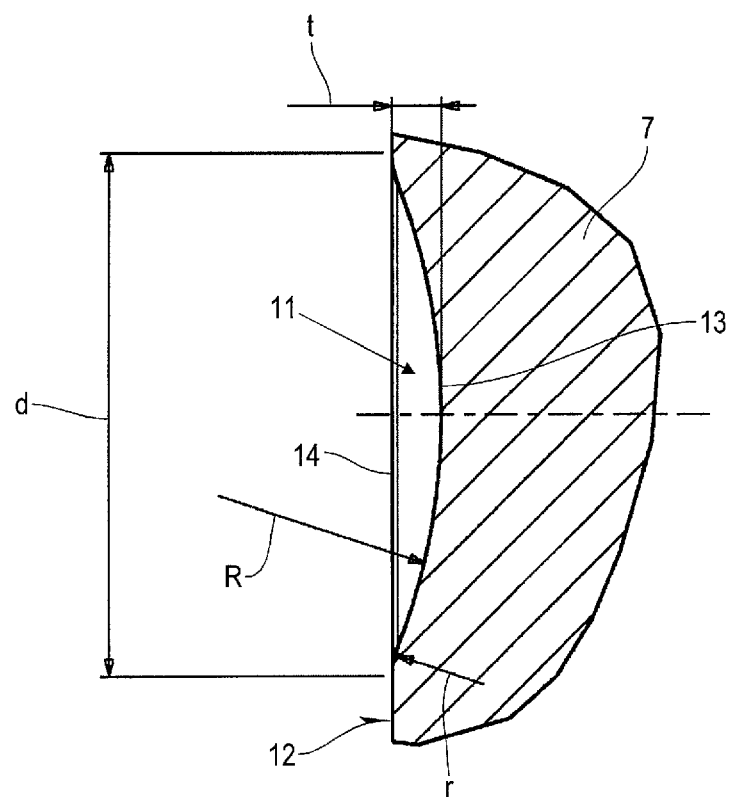
FIG. 4 is an enlarged cross-sectional view of the drive base of FIG. 3 with details on the geometric configuration of the lubricant pockets.

FIG. 4 shows an enlarged detailed view of a longitudinal section through the drive base 7 of the drive link 6 of FIG. 3 in the area of a single lubricant pocket 11. The lubricant pocket 11 has a concavely curved pocket base 13. Various forms of the concave curvature can be considered, each of which have a mean radius of curvature R. In the shown embodiment, in combination with the circularly-disc-shaped planform of the lubricant pocket, the pocket base 13 is configured in the shape of a spherical segment with a radius of curvature which is the same at every location. This same or constant radius of curvature is equal to the mean radius of curvature R. The mean radius of curvature R of the pocket base 13 is in a range of 1.5 mm up to and including 5.5 mm and preferably in a range of 2.5 mm up to and including 4.5 mm. In the shown preferred embodiment, the mean radius of curvature is approximately 3.5 mm. The pocket edge 14, which surrounds the lubricant pocket 11, has a convexly rounded cross-section and provides for a consistent and smooth transition from the pocket base 11 to the adjacent sliding surface 12. The peripheral pocket edge 14 has a mean radius of curvature r which preferably is in the range of 0.5 mm up to and including 0.25 mm and here is approximately 0.15 mm.

As a result of the peripheral pocket edge 14, a mean diameter (d) of the lubricant pocket 11 is given. The mean diameter (d) in the shown embodiment is equal to the actual diameter because of the circular-disc shape of the lubricant pocket 11. In the case of deviating planforms of the lubricant pocket 11, for example, in the shape of ovals, ellipses or the like, the mean diameter (d) can be formed from this irregular shape by means of averaging the distance between opposite-lying points of the pocket edge 14. Furthermore, it can be seen in FIG. 4 that a maximum depth (t) of the lubricant pocket 11 measured perpendicularly to the sliding surface 12 is given by the pocket base 13 and the sliding surface 12 adjoining the lubricant pocket 11. The ratio of the mean diameter (d) to the maximum depth (t) is advantageously in a range of 5.0 up to and including 25.0, expediently in a range of 7.0 up to and including 15.0 and here is approximately 10.0.

It is practical that the mean diameter (d) of the lubricant pocket 11 lies in a range of 0.6 mm up to and including 1.0 mm, preferably in a range of 0.7 mm up to and including 0.9 mm, and here is approximately 0.8 mm. The maximum depth (t) is advantageously in a range of 0.04 mm up to and including 0.12 mm, preferably in a range of 0.06 mm up to and including 0.10 mm, and here is approximately 0.08 mm.

Figure 5:
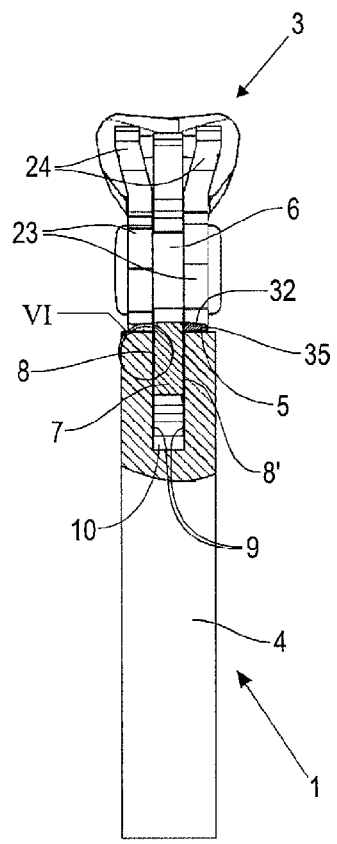
FIG. 5 is an enlarged cross-sectional view of the cutting assembly of FIG. 1 in the area of the detail II shown therein with information as to the formation of friction pairings.

FIG. 5 shows a cross-sectional view of the cutting assembly 1 of FIG. 1 in the area referred to by II. According thereto, the drive links 6 are alternately arranged between a connecting link 23 and a cutting link 24. The drive bases 7 of the drive links 6 project into the guide groove 10, in which connection they slidingly rest with their opposing side surfaces (8, 8) opposite on both sides against the side walls 9 of the guide groove 10 which are also opposite on both sides. A lubricating oil film 35 forms between the lower edge 32 of the connecting links 23 or the cutting links 24 and the outer edges 5 of the guide bar 4, while a lubricating oil film 36, shown in FIGS. 6 and 7, forms between the side surfaces (8, 8') and the adjacent side walls 9.

Figure 6:
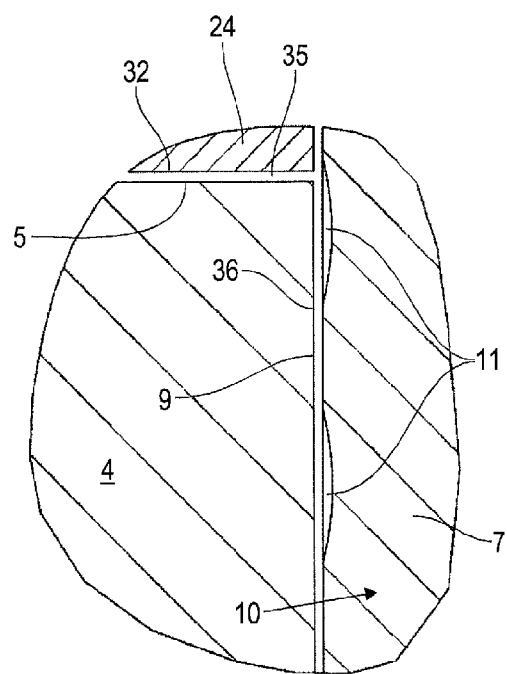
FIG. 6 is an enlarged view of detail VI of FIG. 5 with details on the mutual arrangement of the lubricant pockets and the side wall of the guide groove.

FIG. 6 shows an enlarged view of the detail VI of FIG. 5, according to which the lubricant pockets 11 are open toward the opposing side wall 9 of the guide bar 4. A portion of the lubricant pockets 11 is arranged in such a manner that they extend over and beyond the cover of the side wall 9 and its demarcation through the outer edge 5 and thus cover the lubricating oil film between the lower edge 32 and the outer edge 5 as well as a small portion of the cutting link 24 and/or the connecting link 23 (FIG. 5). Thus, the lubricant pockets 11 have an effect not only on the lubricating oil film 36 between the drive bases 7 and the side walls 9 of the guide groove 10 but also on the lubricating oil film 35 between the lower edges 32 and the outer edges 5.

Figure 7:
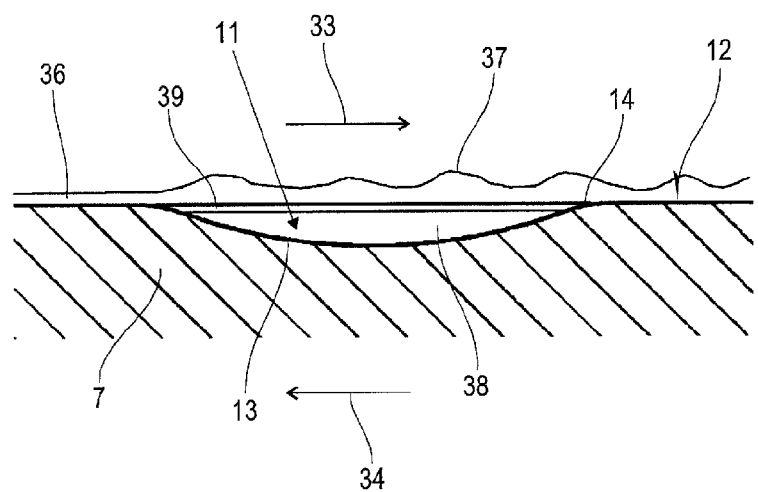
FIG. 7 is a section view according to FIG. 4 with schematically indicated lubricant reservoir, discharge volume, and lubricant film including a turbulent area forming in the lubricant film, all of which result during operation.

FIG. 7 shows the arrangement of FIG. 4 in operation with the schematically shown formation of the oil film 36.

Within the limits of a single lubricant pocket 11, which are formed by the pocket base 13, the peripheral pocket edge 14, as well as the plane formed by the sliding surface 12, each individual lubricant pocket 11 has a volume which is in a range of 0.012 mm$^3$ up to and including 0.028 mm$^3$ and here is approximately 0.020 mm$^3$ and is filled with lubricating oil.

During operation, the drive base 7 moves relative to the side wall 9 (not shown) of the guide groove 10 (FIG. 6) in correspondence with arrows (33, 34). In the embodiment of the cutting assembly 1 and/or the saw chain 3 (FIG. 1) of the invention, a three-layered design of the lubricating oil can be seen in accordance with the representation in FIG. 7. In the lower area adjacent to the pocket base 13 there is a lubricant reservoir 38, above which a discharge volume 39 extends approximately up to the plane of the sliding surface 12. The lubricant reservoir 38 and the discharge volume 39 of the lubricating oil in combination form the volume of a single lubricant pocket 11. Above this, the lubricating oil film 36 forms the third layer. As a result of such a configuration, the lubricating oil film 36 experiences turbulence in the area of the lubricant pocket 11 according to arrows (33, 34) as a result of the shearing movement. This turbulence creates a turbulent area 37 in the lubricating oil film 36, which is indicated schematically by an irregular line, and which extends over the area of the lubricant pocket 11 as well as over a portion of the adjacent sliding surface 12. As a result of the turbulence, on the one hand, a lubricating oil exchange with the discharge volume 39 takes place. Thus, the lubricating oil film 36 is supplied with additional lubricating oil from the reservoir 38 and the discharge volume 39 during load peaks. On the other hand, the turbulent area 37 has an improved bonding to the smooth and unstructured sliding surface 12. By means of the aforementioned geometric configuration and arrangement of the lubricant pockets 11, a formation of the oil film 36 can be achieved, in which the oil film 36 is made up almost completely of a turbulent area 37 over the entire side surface 8. Thus, the bonding of the oil film 36 to the smooth and unstructured sliding surface 12 is improved and the removal of the lubricating oil film 36 from the sliding surface 12 or the side wall 9 (FIG. 6) is reliably avoided. Even under unfavorable operating conditions no dry friction occurs, so that the friction is reduced and the service life of the saw chain 3 and/or the cutting assembly 1 as a whole (FIG. 1) is increased.

It is understood that the foregoing description is that of the preferred embodiments of the invention and that various changes and modifications may be made thereto without departing from the spirit and scope of the invention as defined in the appended claims.

What is claimed is:

1. A cutting assembly for a handheld motor-driven chainsaw, said cutting assembly comprising:
   a saw chain having a plurality of pivotally interconnected chain links wherein a portion of said chain links are drive links having respective drive bases;
   a guide bar having a peripheral edge defining a guide groove having side walls;
   said guide bar being configured to guide said saw chain along said peripheral edge;
   each one of said drive bases having side surfaces and being configured to be slidingly guided between said side walls of said guide groove under the formation of a friction pairing;
   a plurality of lubricant pockets formed in at least one of said side surfaces and being open toward the side wall of said guide groove corresponding to said one side surface and said lubricant pockets being otherwise closed;
   said one side surface having a flat sliding surface outside of said lubricant pockets which is configured to slide along the side wall of said guide groove corresponding thereto;
   said lubricant pockets having a mean diameter (d) lying in a range of 0.6 mm up to and including 1.0 mm and a maximum depth (t) lying in a range of 0.06 mm up to and including 0.10 mm; and,
   said mean diameter (d) having a ratio to said maximum depth (t) of 5.0 up to and including 25.0.

2. The cutting assembly of claim 1, wherein said mean diameter (d) has a ratio to said maximum depth (t) of 7.0 up to and including 15.0.

3. The cutting assembly of claim 1, wherein said mean diameter (d) has a ratio to said maximum depth (t) of approximately 10.0.

4. The cutting assembly of claim 1, wherein said mean diameter (d) of said lubricant pocket lies in a range of 0.7 mm up to and including 0.9 mm.

5. The cutting assembly of claim 1, wherein said mean diameter is 0.8 mm.

6. The cutting assembly of claim 1, wherein said maximum depth (t) of said lubricant pocket is 0.08 mm.

7. The cutting assembly of claim 1, wherein:
said lubricant pocket has a concavely curved pocket base having a mean radius of curvature (R); and,
said mean radius of curvature (R) lies in a range of 1.5 mm up to and including 5.5 mm.

8. The cutting assembly of claim 1, wherein:
said lubricant pocket has a concavely curved pocket base having a mean radius of curvature (R); and,
said mean radius of curvature (R) lies in a range of 2.5 mm up to and including 4.5 mm.

9. The cutting assembly of claim 1, wherein said lubricant pocket has a concavely curved pocket base having a mean radius of curvature (R) of 3.5 mm.

10. The cutting assembly of claim 1, wherein:
said lubricant pocket has a convexly rounded peripheral pocket edge having a mean radius of curvature (r); and,
said mean radius of curvature (r) lies in a range of 0.05 mm up to and including 0.25 mm.

11. The cutting assembly of claim 1, wherein said lubricant pocket has a convexly rounded peripheral edge having a mean radius of curvature (r) of 0.15 mm.

12. The cutting assembly of claim 1, wherein said lubricant pocket defines a volume which lies in a range of 0.012 $mm^3$ up to and including 0.028 $mm^3$.

13. The cutting assembly of claim 1, wherein said lubricant pocket defines a volume of 0.020 $mm^3$.

14. The cutting assembly of claim 1, wherein:
said lubricant pockets each has a pocket surface;
said sliding surface has a base surface; and,
the sum of said pocket surfaces of a single side surface lies in a range of 10% up to and including 40% of said base surface.

15. The cutting assembly of claim 1, wherein:
said lubricant pockets each have a pocket surface;
said sliding surface has a base surface; and,
the sum of said pocket surfaces of a single side surface lies in a range of 15% up to and including 30% of said base surface.

16. The cutting assembly of claim 1, wherein:
said lubricant pockets each have a pocket surface;
said sliding surface has a base surface; and,
the sum of said pocket surfaces of a single side surface is 20% of said base surface.

17. The cutting assembly of claim 1, wherein:
said one side surface is delimited by a side surface edge;
said lubricant pockets are disposed at a distance (a) to said side surface edge; and,
said distance (a) is at least 0.5 mm.

18. The cutting assembly of claim 1, wherein said drive base has a pass-through lubricant storage opening arranged therein.

19. The cutting assembly of claim 1, further comprising a lubricant channel arranged in said one side surface.

20. The cutting assembly of claim 18, wherein:
said lubricant storage opening has an outer edge;
said lubricant pockets are arranged at a distance (b) from said outer edge of said lubricant storage opening; and,
said distance (b) is at least 0.3 mm.

21. The cutting assembly of claim 19, wherein:
said lubricant pockets are arranged at a distance (b) from said lubricant channel; and,
said distance (b) is at least 0.3 mm.

22. The cutting assembly of claim 1, wherein said lubricant pockets have a circular-disc shaped layout.

23. The cutting assembly of claim 22, wherein said lubricant pocket has a pocket base in the form of a spherical section.

24. The cutting assembly of claim 1, wherein at least four lubricant pockets are provided in said one side surface.

25. The cutting assembly of claim 1, wherein at least seven lubricant pockets are provided in said one side surface.

26. The cutting assembly of claim 1, wherein at least ten lubricant pockets are provided in said one side surface.

27. A cutting assembly for a handheld motor-driven chainsaw, said cutting assembly comprising:
a saw chain having a plurality of pivotally interconnected chain links wherein a portion of said chain links are drive links having respective drive bases;
a guide bar having a peripheral edge defining a guide groove having side walls;
said guide bar being configured to guide said saw chain along said peripheral edge;
each one of said drive bases having side surfaces and being configured to be slidingly guided between said side walls of said guide groove under the formation of a friction pairing;
a plurality of lubricant pockets formed in at least one of said side surfaces and being open toward the side wall of said guide groove corresponding to said one side surface and said lubricant pockets being otherwise closed;
said one side surface having a flat sliding surface outside of said lubricant pockets which is configured to slide along the side wall of said guide groove corresponding thereto;
said lubricant pockets having a mean diameter (d) lying in a range of 0.6 mm up to and including 1.0 mm and a maximum depth (t) of said lubricant pocket lying in a range of 0.04 mm up to and including 0.12 mm; and,
said mean diameter (d) having a ratio to said maximum depth (t) of 5.0 up to and including 25.0.

28. A saw chain of a cutting assembly for a handheld motor-driven chainsaw, the cutting assembly including a guide bar having a peripheral edge defining a guide groove having side walls and the guide bar being configured to guide the saw chain along the peripheral edge, the saw chain comprising:
a plurality of pivotally interconnected chain links wherein a portion of said chain links are drive links having respective drive bases;
each of said drive bases having side surfaces and being configured to be slidingly guided between said side walls of said guide groove under the formation of a friction pairing;
a plurality of lubricant pockets formed in at least one of said side surfaces and being open toward the side wall of said guide groove corresponding to said one side surface and said lubricant pockets being otherwise closed;
said one side surface having a flat sliding surface outside of said lubricant pockets which is configured to slide along the side wall of said guide groove corresponding thereto;
said lubricant pockets having a mean diameter (d) lying in a range of 0.6 mm up to and including 1.0 mm and a maximum depth (t) lying in a range of 0.06 mm up to and including 0.10 mm; and,
said mean diameter (d) having a ratio to said maximum depth (t) of 5.0 up to and including 25.0.

* * * * *